United States Patent
Lepez et al.

(10) Patent No.: US 10,502,486 B2
(45) Date of Patent: Dec. 10, 2019

(54) HEAT TREATMENT DEVICE COMPRISING A SCREW PROVIDED WITH AN ELECTRICALLY INSULATING STRIP

(71) Applicant: E.T.I.A.—EVALUATION TECHNOLOGIQUE, INGENIERIE ET APPLICATIONS, Compiegne (FR)

(72) Inventors: Olivier Lepez, Lamorlaye (FR); Philippe Sajet, Lacroix Saint-Ouen (FR)

(73) Assignee: E.T.I.A.—EVALUATION TECHNOLOGIQUE, INGENIERIE ET APPLICATIONS, Compiegne (FR)

( * ) Notice: Subject to any disclaimer, the term of this patent is extended or adjusted under 35 U.S.C. 154(b) by 696 days.

(21) Appl. No.: 15/301,568

(22) PCT Filed: Mar. 11, 2015

(86) PCT No.: PCT/EP2015/055068
§ 371 (c)(1),
(2) Date: Oct. 3, 2016

(87) PCT Pub. No.: WO2015/161956
PCT Pub. Date: Oct. 29, 2015

(65) Prior Publication Data
US 2017/0115055 A1    Apr. 27, 2017

(30) Foreign Application Priority Data
Apr. 24, 2014 (FR) ...................................... 14 53715

(51) Int. Cl.
*B65G 33/14* (2006.01)
*B65G 33/26* (2006.01)
(Continued)

(52) U.S. Cl.
CPC ................. *F26B 3/24* (2013.01); *B65G 33/24* (2013.01); *B65G 33/265* (2013.01); *F26B 17/20* (2013.01)

(58) Field of Classification Search
None
See application file for complete search history.

(56) References Cited

U.S. PATENT DOCUMENTS

| 6,375,345 B1* | 4/2002 | Lepez | ...................... H05B 3/40 |
|---|---|---|---|
| | | | 219/209 |
| 2011/0171063 A1* | 7/2011 | Lepez | ...................... A61L 2/07 |
| | | | 422/26 |
| 2015/0204609 A1* | 7/2015 | Lepez | ..................... F26B 17/20 |
| | | | 219/388 |

FOREIGN PATENT DOCUMENTS

| FR | 2 774 545 A1 | 8/1999 |
|---|---|---|
| FR | 2 924 300 A1 | 5/2009 |

(Continued)

OTHER PUBLICATIONS

FR2930448A1, Sajet et al, Aug. 2009, partial translation (Year: 2009).*

*Primary Examiner* — Joseph M Pelham
(74) *Attorney, Agent, or Firm* — Muncy, Geissler, Olds & Lowe, P.C.

(57) ABSTRACT

The invention relates to a device for the heat treatment of a product, comprising an enclosure, means of conveyance inside the enclosure, which comprise a screw mounted so as to rotate in the enclosure about a geometrical rotational axis and means for rotating the screw about said axis, and means for heating the screw by Joule effect. According to the invention, the screw comprises a strip which is made of an electrically insulating material and is applied to the screw so as to form an outer circumference of the screw.

6 Claims, 3 Drawing Sheets

(51) Int. Cl.
*F26B 3/24* (2006.01)
*B65G 33/24* (2006.01)
*F26B 17/20* (2006.01)

(56) References Cited

FOREIGN PATENT DOCUMENTS

| FR | 2930448 A1 * | 10/2009 | ............. A23C 3/037 |
| FR | 3030559 A1 * | 6/2016 | ............... C10G 1/02 |
| WO | WO-2009095564 A2 * | 8/2009 | ............... C10B 7/10 |
| WO | WO 2014/044517 A1 | 3/2014 | |

\* cited by examiner

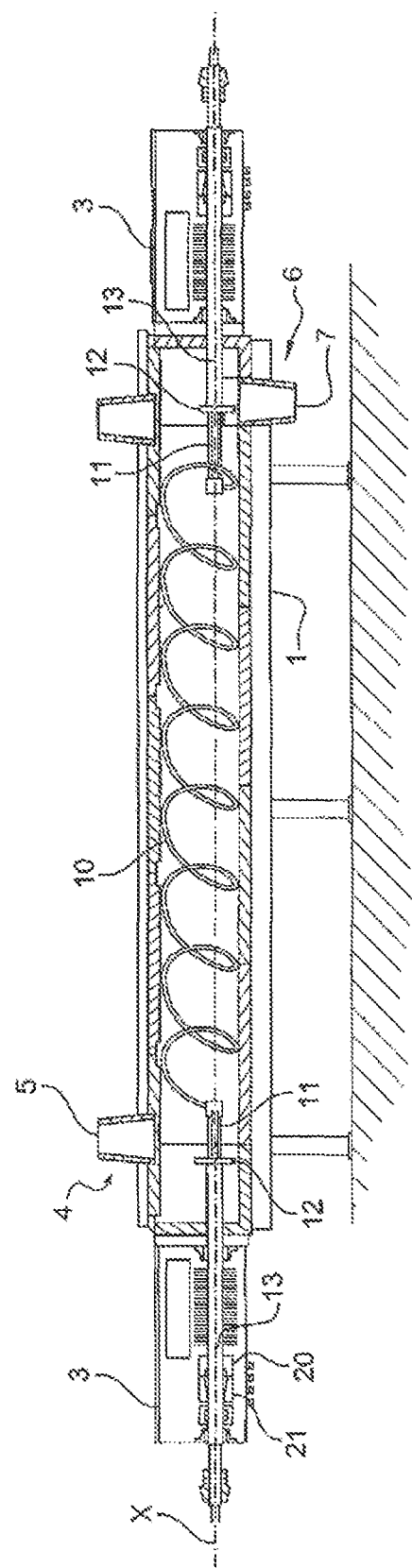

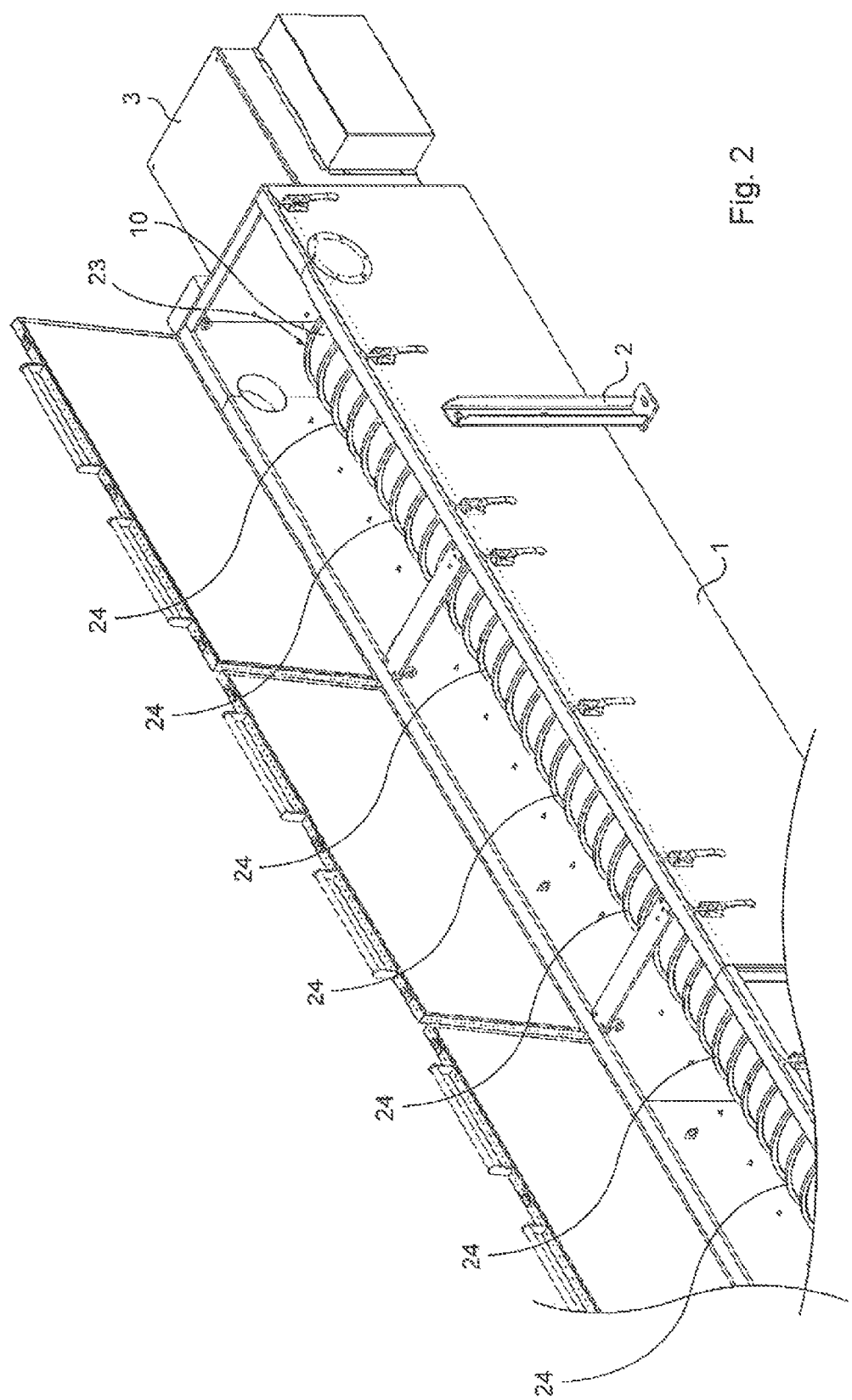

HEAT TREATMENT DEVICE COMPRISING A SCREW PROVIDED WITH AN ELECTRICALLY INSULATING STRIP

The invention relates to a device for applying heat treatment to a divided substance such as a foodstuff (spices, herbs, cereals, dehydrated vegetables, . . . ), a biomass, a polymer material, or any other divided solid.

TECHNOLOGICAL BACKGROUND OF THE INVENTION

A heat treatment device is known that comprises an enclosure with means for conveying the substance between the inlet of the enclosure and the outlet of the enclosure, which means comprise a screw mounted to rotate inside the enclosure about an axis of rotation and means for driving the screw in rotation. The device also includes means for heating the screw by the Joule effect.

The substance for treatment is usually inserted into the inlet of the enclosure in the form of divided solids. The screw urges the particles of substance continuously towards the outlet of the enclosure. Because of the temperature of the screw, the substance is heated progressively as it advances, thereby subjecting it to heat treatment (drying, debacterization, cooking, roasting, pyrolysis, . . . ).

Such a device enables the treated substances to be heated uniformly.

Nevertheless, because the conveyor means do not have a shaft around which the screw winds, the screw rests against the inside wall of the enclosure. However, the enclosure is generally made of metal and is thus electrically conductive. In order to avoid a short circuit in the device when the means for heating the screw are active, the inside wall of the enclosure is thus covered in a layer of electrically insulating material against which the screw comes to bear directly.

Nevertheless, the screw rubs against the electrically insulating layer as it rotates inside the enclosure, thereby tending to damage the layer. Such a layer turns out to be difficult and expensive to replace.

OBJECT OF THE INVENTION

An object of the invention is to propose a heat treatment device that enables the above-mentioned problem to be mitigated.

BRIEF DESCRIPTION OF THE INVENTION

In order to achieve this object, the invention provides a device for applying heat treatment to a substance, the device comprising:
   an enclosure;
   conveyor means for conveying the substance between an inlet of the enclosure and an outlet of the enclosure, which conveyor means comprise a screw mounted to rotate inside the enclosure about an axis of rotation and include drive means for driving the screw in rotation about said axis; and
   means for heating the screw by the Joule effect.

According to the invention, the screw includes a strip made of electrically insulating material that is fitted on the screw so as to form an outer periphery of the screw.

Thus, the screw rests against the inside wall of the enclosure via the electrically insulating strip so that the screw and the enclosure remain electrically insulated relative to each other. The inside wall of the enclosure thus has no need to include the electrically insulating layer of the prior art.

In the event of the electrically insulating strip on the screw becoming damaged as a result of the strip rubbing against the inside wall of the enclosure while the screw is rotating, it is also found to be simpler and less expensive to replace said strip with a new strip of the invention, given that the screw is movable.

BRIEF DESCRIPTION OF THE DRAWINGS

The invention can be better understood in the light of the following description of a non-limiting embodiment of the invention given with reference to the accompanying drawings, in which:

FIG. 1 is a diagrammatic section view of a treatment device of the invention;

FIG. 2 is a fragmentary perspective view of the treatment device shown in FIG. 1, the enclosure of said device being shown open;

DETAILED DESCRIPTION OF THE INVENTION

Figure 4:
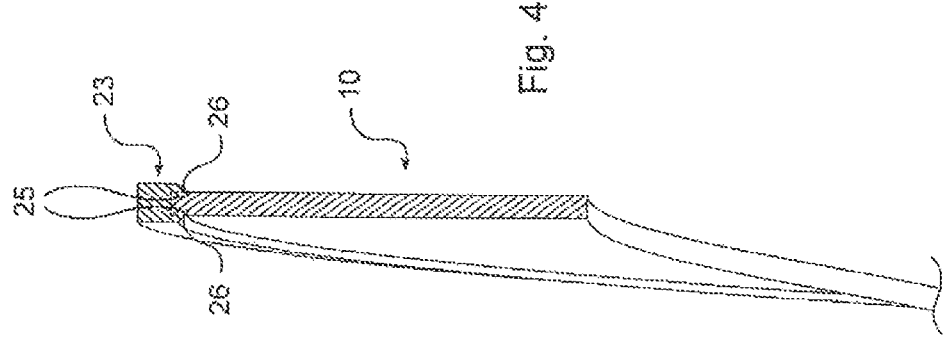
FIG. 4 is an enlarged view of a portion of the screw shown in FIG. 3.
Figure 3:
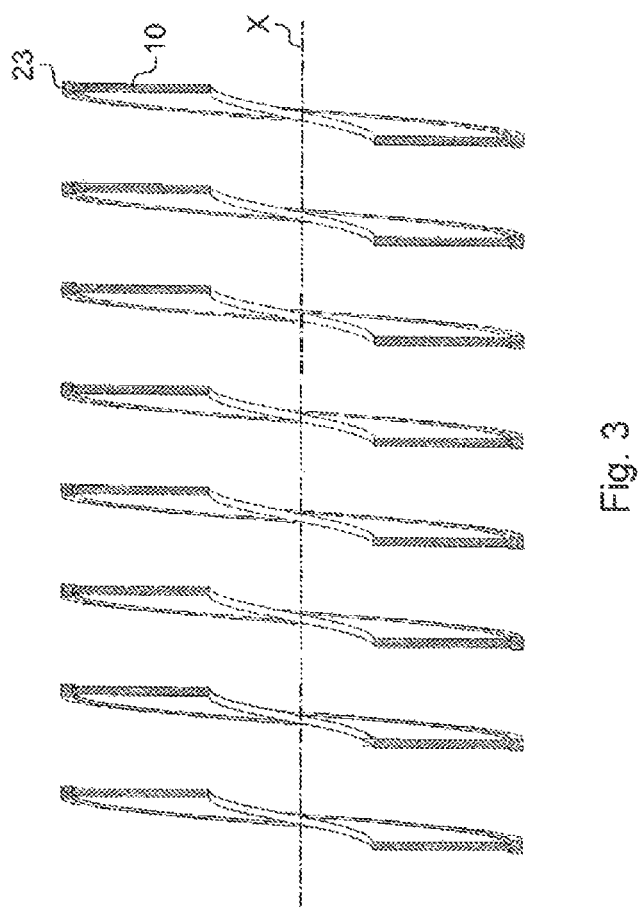
FIG. 3 is a fragmentary section view of the screw of the treatment device shown in FIG. 1, the section plane containing the axis of rotation of the screw.

With reference to FIGS. 1 to 4, the device of the invention serves to apply heat treatment to a substance. For this purpose, the device has an enclosure 1 extending generally in an essentially horizontal direction, and it is held off the ground by legs 2. In this example, the enclosure 1 is made of metal, and in particular it is made of non-magnetic stainless steel. An equipment box 3 is fastened to each of the ends of the enclosure 1.

In this example, the enclosure 1 has an inlet 4 formed in the cover of the enclosure 1 substantially at a first end of the enclosure 1. In a particular embodiment, the device has an inlet chimney 5 that is connected in sealed manner to the inlet 4 of the enclosure. The inlet chimney 5 may for example be connected to a device for grinding, for compacting, or for granulating the substance in question into a divided solid, or indeed it may be connected to a device for preconditioning the substance in question in the form of divided solids. A preconditioning device enables said substance to be heated and dried to specified values of temperature and of relative humidity, or indeed enables the substance to be densified. The divided solids may be in the form of powders, granules, pieces, fibers, . . . , in two dimensions in the form of flakes, or indeed in three dimensions in the form of granules.

The enclosure 1 also includes an outlet 6 that is arranged in this example in the bottom of the enclosure 1, substantially at the second of the two ends of the enclosure 1. In a particular embodiment, the device has an outlet chimney 7 that is connected in sealed manner to the outlet 6 of the enclosure 1. By way of example, the outlet chimney 7 is connected to a device for cooling the substance.

The device also has means for conveying the substance between an inlet of the enclosure 1 and an outlet of the enclosure 1. Said means thus comprise a screw 10 that extends in this example along the enclosure 1 along an axis X between the two equipment boxes 3 and that is mounted to rotate about said axis X inside the enclosure 1. By way of example, the screw 10 is made of stainless steel. In this example, the screw 10 is in the form of a helicoid that is fastened, e.g. by welding, and each of its two ends to the end of a shaft segment 11. Each of said shaft segments 11 is connected at its other end, via a flange 12, to an extension shaft 13 on the same axis that passes through the equipment box at the associated end.

The conveyor means also include means for driving the screw 10 in rotation about the axis X, e.g. arranged in one of the equipment boxes 3. In a particular aspect of the invention, the rotary drive means comprise an electric motor and mechanical means connecting the outlet shaft of the motor to an end of the associated extension shaft 13, the extension shaft 13 itself driving the screw 10. In this example, the rotary drive means include means for controlling the speed of rotation of the outlet shaft of the motor, e.g. comprising a variable speed device. The control means thus enable the speed of rotation of the screw 10 to be matched to the substance being conveyed, i.e. to match the transit time in the enclosure 1 to that substance.

The device also has means for heating the screw 10 by the Joule effect, which means are arranged in the equipment boxes 3. In a particular embodiment, the heater means comprise electricity generator means and means for connecting the two ends of the screw to the two polarities of said generator means. For this purpose, each extension shaft 13 is rigidly secured to a coaxial drum 20 made of electrically conductive material, having carbon brushes 21 rubbing thereagainst to deliver electricity, which brushes are connected by conductor wires (not shown) to the electricity generator means. In a particular aspect of the invention, the heater means comprise means for regulating the magnitude of the current conveyed by the screw 10. In this example, the regulator means comprise a dimmer interposed between the electricity generator means and the connection means. The regulator means thus enable the electric current carried by the screw 10 to be adapted to the substance being conveyed.

In operation, the substance for treatment is inserted into the inlet chimney 5 in the form of raw divided solids or preconditioned divided solids, and the screw 10 exerts thrust continuously on the divided solids towards the outlet 6 of the enclosure 1. Because of the temperature of the screw 10, the divided solids are subjected to heat treatment depending on the operating conditions that have been selected in terms of time and temperature. The screw 10 thus serves both to subject the substance to heat treatment and to convey the substance.

For further details, reference may be made to Document FR 2 924 300 in the name of the Applicant, in which the enclosure 1, the conveyor means, and the heater means are described in detail.

In the invention, the screw 10 also has a strip 23 made of electrically insulating material that is fitted to the screw 10 so as to form an outer periphery of the screw 10. The strip 23 is thus fitted on the screw so as to extend helically around the axis X. The strip 23 thus forms a radial extension of the screw, and more particularly in this example of the helicoid.

The strip 23 in this example is arranged to extend over the entire length of the screw, i.e. the strip extends along the helicoid over the entire axis X. The periphery of the screw 10 is thus always covered by the strip 23.

In particular manner, the strip 23 covers the screw 10 in part in the radial direction.

Typically, the strip 23 has a thickness lying in the range 4 millimeters (mm) to 20 mm (where its thickness is defined in the radial direction).

In particular manner, the strip 23 is made of polytetrafluoroethylene (more widely known under the name Teflon, registered trademark) or indeed of polyetheretherketone, more widely known as PEEK.

In a particular embodiment, the strip 23 has a plurality of segments 24. Preferably, each segment 24 is shaped to be suitable for snap-fastening to the periphery of the screw 10. By way of example, the screw 10 may include slots 25 in its main faces (only two of them being referenced herein) into which corresponding snap-fastening tabs 26 (only two of which are referenced herein) of the segments 24 penetrate resiliently.

Thus, in order to insulate the screw 10 electrically from the enclosure 1, it suffices to engage each segment 24 separately on the screw in order to define the strip 23. While the segments 24 are being put into place, the various segments 24 are arranged to touch one another so as to avoid leaving any gaps between these segments 24.

It is thus very simple to fit the strip 23 on the screw 10 and thus also to change the strip 23 when it becomes worn. It is also possible to change only a single segment 24 that has become damaged, which avoids the need to replace the entire strip 23.

Naturally, the invention is not limited to the embodiment described and embodiment variations may be applied thereto without going beyond the ambit of the invention as defined by the claims.

In particular, although the screw described herein presents electrical resistance that is identical all along its axis of rotation, the screw could have electrical resistance that varies along said axis. The screw could thus present geometrical characteristics (pitch, diameter, height, number of turns, . . . ) that vary along said axis. For further details, reference may be made to Document FR 2 995 986 in the name of the Applicant. Naturally, the shape of the strip should be adapted accordingly so as to enable it to be fitted onto such a screw, even though the shape of the screw varies along its axis of rotation.

The strip may be different from the above description. Instead of being clipped onto the screw, the strip could be fastened to the screw without penetrating into the screw, e.g. by using adhesive or indeed screw fasteners. If the strip is made up of a plurality of segments, the segments may be connected to one another instead of merely being placed adjacent to one another as described above. The segments may thus be assembled to one another, e.g. by adhesive or by welding. The strip need not cover the screw over its entire length, providing the periphery of the screw that is not covered by the strip does not come directly into contact with the inside wall of the enclosure. In any event, the strip may be of any shape appropriate for electrically insulating the inside wall of the enclosure from the screw.

Although the strip is described herein as being made of Teflon, the strip could be made of any other electrically insulating material providing said material presents mechanical characteristics that enable it to be sufficiently flexible to enable the strip to follow the periphery of the screw over the entire length of the screw.

The invention claimed is:

1. A device for applying heat treatment to a substance, the device comprising:
   an enclosure;
   conveyor means for conveying the substance between an inlet of the enclosure and an outlet of the enclosure, which conveyor means comprise a screw mounted to rotate inside the enclosure about an axis of rotation and include drive means for driving the screw in rotation about said axis; and means for heating the screw by the Joule effect;

wherein the screw includes a strip made of electrically insulating material that is fitted on the screw so as to form an outer periphery of the screw.

2. The device according to claim 1, wherein the strip is arranged to form the entire outer periphery of the screw.

3. The device according to claim 1, wherein the strip is made of polytetrafluoroethylene.

4. The device according to claim 1, wherein the strip is made of polyetheretherketone.

5. The device according to claim 1, wherein the strip is of thickness lying in the range 4 mm to 20 mm.

6. The device according to claim 1, wherein the strip is snap-fastened on the screw.

* * * * *